United States Patent [19]

Foster

[11] Patent Number: 4,921,008
[45] Date of Patent: May 1, 1990

[54] AUTOMATIC FLUID FLOW SHUTOFF DEVICE

[75] Inventor: Geoffrey F. Foster, Glenorie, Australia

[73] Assignee: Premier-Fosters (Australia) Limited, New South Wales, Australia

[21] Appl. No.: 222,205

[22] Filed: Jul. 21, 1988

[51] Int. Cl.$^5$ ............................................. E03B 5/00
[52] U.S. Cl. ..................................... 137/557; 137/460
[58] Field of Search ................................. 137/557, 460

[56] References Cited

U.S. PATENT DOCUMENTS

| | | | |
|---|---|---|---|
| 2,601,968 | 7/1952 | Danielson | 251/120 |
| 2,629,578 | 2/1953 | Paul, Jr. | 137/460 |
| 3,850,189 | 11/1974 | Follett | 137/39 |
| 4,071,038 | 1/1978 | Robinson | 137/39 |

FOREIGN PATENT DOCUMENTS

| | | | |
|---|---|---|---|
| 72655 | 6/1951 | Denmark | 137/460 |
| 0192474 | 8/1986 | European Pat. Off. | |
| 2249598 | 5/1973 | Fed. Rep. of Germany | 137/460 |
| 744502 | 4/1933 | France | 137/460 |
| 57-47098 | 3/1982 | Japan | |
| 86/02421 | 4/1986 | PCT Int'l Appl. | |
| 551386 | 2/1943 | United Kingdom | |
| 1534672 | 12/1978 | United Kingdom | |

Primary Examiner—A. Michael Chambers
Attorney, Agent, or Firm—Majestic, Parsons, Siebert & Hsue

[57] ABSTRACT

An emergency gas flow shutoff device for use primarily with gas cylinder operations. When there is a sudden loss of resistance downstream of the device due to a cut hose or a fire from a severed hose a ball located in the device completely closes off an orifice to stop further gas flow. The device also incorporates a gas flowmeter or pressure gauge as part of the reset mechanism thus eliminating additional connectors.

2 Claims, 2 Drawing Sheets

AUTOMATIC FLUID FLOW SHUTOFF DEVICE

The present invention relates to a fluid flow shutoff device and in particular to an emergency, automatic shutoff device for gas cylinder operation.

BACKGROUND ART

Prior art gas systems such as cylinders and gas supply pipework typically used for L.P. gas, butane or natural gas have the disadvantages of continued gas flow in cases such as when fire has burnt through the supply pipework allowing unburnt gas to fuel fires and/or cause devastating explosions.

In addition inexperienced operators of gas systems such as children may cause fires and/or explosions by actuating gas systems accidentally and/or unsupervised.

One device for overcoming this problem interposed a resettable flow reduction device wherein on a sudden gas surge due to a "blowout" in a downstream line, the gas flow as substantially reduced to a low level. Once the problem was rectified a reset button was depressed to allow the gas to flow again in the normal manner.

The problems with this device were:
(i) that it did not fully shut off the gas flow;
(ii) that it did not work properly unless the device was correctly oriented in its designed disposition. If it was tilted from its designed position it would not function properly;
(iii) to fit a gas level or gas pressure gauge required extra components are necessary to connect the device in series with the other pieces of apparatus;
(iv) no way of checking to see if the device is operating correctly; and
(v) no way of cutoffs in case of fire.

DISCLOSURE OF THE INVENTION

It is therefore an objection of the present invention to overcome or substantially ameliorate the above-mentioned disadvantages.

According to one broad form of the present invention there is provided a fluid flow shutoff device comprising: a body, having an inlet for connecting the device to a fluid supply, said inlet leading to a chamber, said chamber having an outlet defined by an orifice of smaller cross section than the chamber, said orifice being in communication with an outlet passage and a hollow shaft connected to and in communication with a pressure measuring gauge; said outlet passage exiting at an outlet end of the body which outlet end is adapted to connect to further fluid transport apparatus; and a ball located and captured in said chamber; wherein fluid is able to flow from the inlet through said chamber and to the outlet in its steady flow or gradually increasing flow regime; and wherein a predetermined pressure differential will cause the higher speed gas flow to drag the ball into the mouth of the orifice and stop the flow of gas; and said hollow shaft being mounted in a sealed axially slidable manner in said body, which in the rest position of said shaft is urged away from the orifice and when depressed will cause the ball to be released from the aperture to restart the fluid flow.

BRIEF DESCRIPTION OF THE DRAWINGS

A preferred form of the invention will now be described, by way of example only, with reference to the accompanying drawings wherein.

Figure 1:
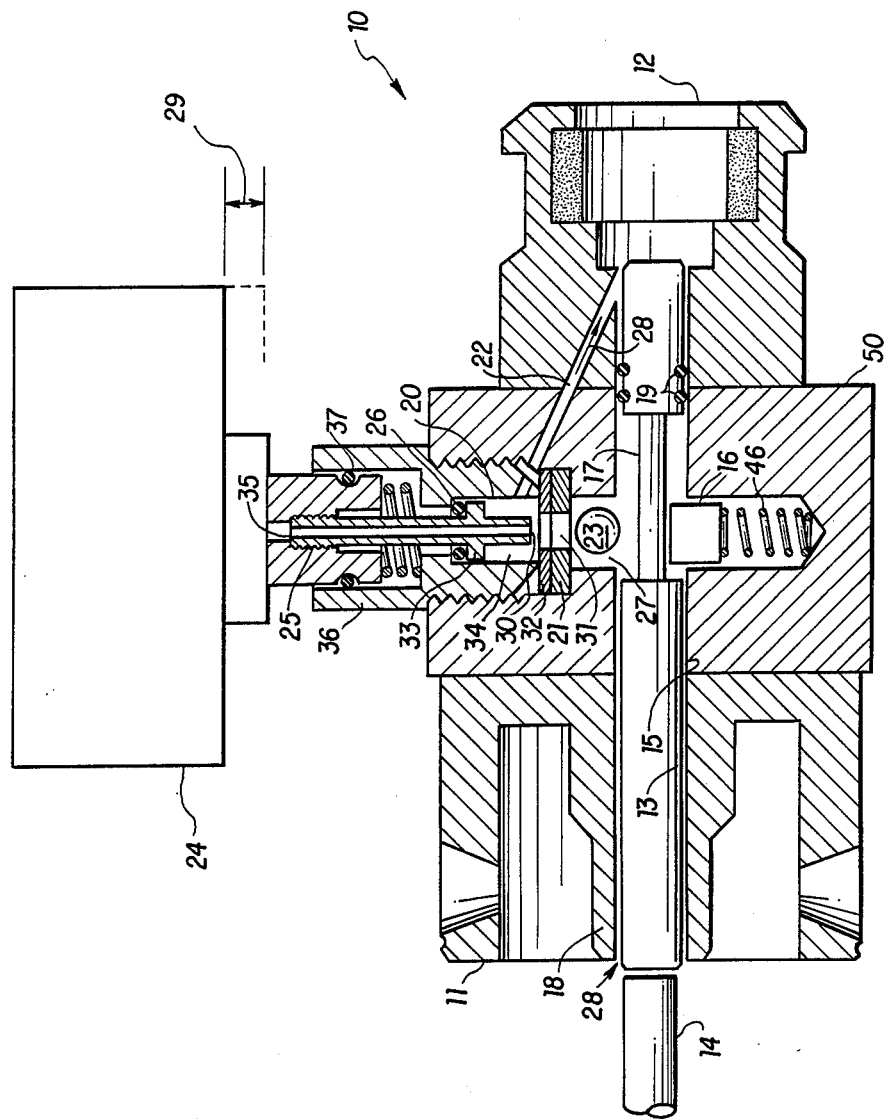
FIG. 1 is a sectional view of one form of the device.

In the drawings there is shown a shutoff device 10 which is connectable to a gas cylinder (not shown) at the inlet end 11. The connection being any conventional means such as a snap-on, push-on, or screw threaded, connection. At its other, outlet end 12 it is adapted to be connected to a regulator (not shown).

In FIG. 1 the device 10 has a shaft 13 located in bore 15 adapted to abut the needle valve 14 of a gas cylinder. In the needle valve closed position (shown) the shaft 13 is situated in the body 15 and held in place by a detent 16 urged towards the shaft 13 by spring 46. The shaft 13 has a recess 17 which accommodates the detent 16, and limits the movement of the shaft 13 within the housing 15.

When the regulator (not shown) attached to the outlet end 12 is opened it engages the shaft 13 (at the outlet end 12) and forces it against the needle valve 14, to open the valve, so that gas flows from the cylinder through the spacing 18 between the shaft 13 and the bore 15 in the direction of arrow 28. The gas is prevented from leaving the outlet end of the bore 15 by O-ring seals 19.

The gas is then directed through an orifice 31 in a resilient seat 21 captured between a rigid seat 32 and the body 50. The orifice 31 allows the inlet to communicate with the passage 22 leading to the outlet end 12 of the body.

Between the shaft recess 17 and orifice 31 is a cylindrical chamber 27 wherein there is captured a spherical ball 23.

A hollow shaft 25 is located and captured by its shoulders 33 in a chamber 34 adjacent the outlet of the orifice 31. The shaft 25 has one end 30 adapted to pass through the orifice 31, and its other end 35 has a pressure gauge 24 mounted thereon. The pressure gauge 24 is also located within a cylindrical guide 36. O-ring seal 37 ensures a gas tight connection of the shaft 25 and pressure gauge 24.

The gauge 24 may be a standard pressure gauge or have a face calibrated to show the amount of gas being consumed by the appliance. This also acts as manual checking device to see if automatic device is working. The gauge shows whether the gas is shut off because when it is shut off the pressure will be zero.

The ball 23 is made of a suitable material and diameter such that the fluid flow will not drag it into the orifice at steady state or gradually increasing flow rates but on sudden acceleration in flow rates it must be dragged into the mouth of the orifice 31 to completely shut off the gas flow. Also at maximum gas flow rates the ball will be dragged into the orifice to close it off. It has been found that a stainless steel ball is suitable for L.P. gas systems. The orifice 21 is made of a suitable material such as neoprene rubber which provides a gas tight seal in combination with a stainless steel ball.

For L.P. gas a stainless steel ball of 4 mm diameter and an orifice of 3 mm diameter have been found to be suitable. When there is a sudden pressure differential in the system, caused by say the hose being blown off or burnt through, or the gas flows steadily at a high velocity the ball 23 will be forced into the orifice 31 by the sudden increase in gas flow rate, to close the orifice, thereby preventing further gas flow. Alternately a gradual increase in flow due to a fire, up to maximum flow rate will drag the ball 23 into the orifice 31 to shut off the flow.

When the fault has been repaired the system may be reactivated by depressing pressure gauge 24 which in turn depresses the hollow shaft 25.

The tip 30 of the shaft 25 then pushes the ball 23 from the orifice and the system is returned to the neutral or "run" position.

If the fault in the line has not been rectified when restarting the system, the ball 23 will again be forced into the opening of the washer 21 and the restart procedure must be followed again when the fault has been repaired.

The construction of the valve of the present invention allows for the valve shutoff to operate at virtually any orientation of the valve so long as the ball 23 does not close of the orifice 31 by gravity. Prior art devices have required the valve to be horizontal to allow for actuation.

Figure 2:
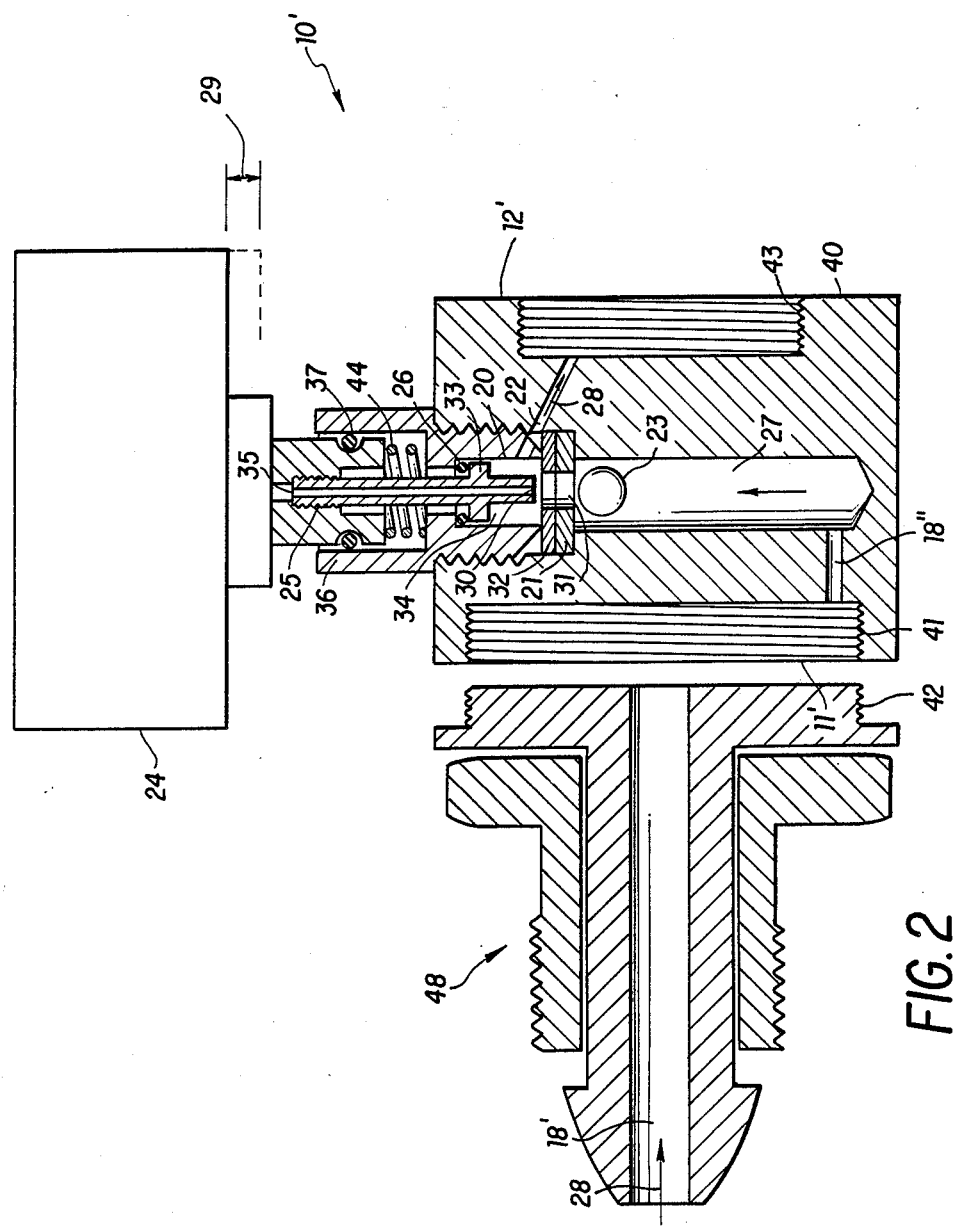
FIG. 2 is a sectional view of a second form of the device.

In FIG. 2 like parts to these in FIG. 1 are numbered in like manner.

In this form of the invention the shaft 13 is omitted as the device 10' is used on the downstream side of a gas flow regulating valve. Thus the body 40 of the device 10' is adapted to receive into screw threaded position 41 the screw threaded end 42 of connector 48. (The connector 48 allows the device 10' to be connected to a gas cylinder (not shown) by means of threaded coupling. (The gas inlet being defined by passages 18' and 18" which are interconnected when the two parts are joined in a gas tight manner).

The outlet end 12' also has a screw threaded portion 43 for receiving a gas flow line (not shown) or other gas apparatus. All other components are identical to those of FIG. 1.

The foregoing describes only two embodiments of the present invention and modifications, obvious to those skilled in the art, can be made thereto without departing from the scope of the present invention.

I claim:

1. A fluid flow shutoff device comprising:
a body, a chamber within said body, an inlet and an outlet communicating with said chamber to permit fluid flow through said chamber, said outlet defining an outlet orifice connected to an outlet passage, a ball valve located and captured in said chamber to one side of said orifice and permitting fluid flow through said orifice to said outlet passage under a steady flow regime or gradually increasing flow regime of fluid through said chamber but seating upon and closing said orifice to arrest said fluid flow under a sharply increasing flow regime of said fluid through said chamber, a hollow shaft slidably mounted within said body at the other side of said orifice and coaxial therewith and being connected to a pressure measuring gauge for measuring via said hollow tube fluid pressure in said outlet passage, and resilient means urging said hollow shaft away from said orifice whereby depression of said hollow shaft against said resiliently means effect unseating of said ball valve from said orifice wherever restarting of fluid flow is required.

2. A fluid flow shutoff device as claimed in claim 1, comprising also an actuator rod slidable with clearance along a bore which extends through said chamber and between said inlet and said outlet to effect control of the supply of fluid via a needle valve in a gas cylinder connected at said inlet, a recess in said rod, a detent in said chamber engageable within said recess to limit the sliding movement of said rod, and a fluid seal between said rod and said bore preventing fluid leak along said bore to said outlet.

* * * * *

UNITED STATES PATENT AND TRADEMARK OFFICE
CERTIFICATE OF CORRECTION

PATENT NO. : 4,921,008

DATED : MAY 1, 1990

INVENTOR(S) : GEOFFREY F. FOSTER

It is certified that error appears in the above-identified patent and that said Letters Patent is hereby corrected as shown below:

Column 4, line 25-26 in Claim 1: replace "wher-ever" with --whenever--

Signed and Sealed this

Sixteenth Day of July, 1991

Attest:

HARRY F. MANBECK, JR.

Attesting Officer

Commissioner of Patents and Trademarks